United States Patent [19]
Takaoka

[11] Patent Number: 5,103,318
[45] Date of Patent: Apr. 7, 1992

[54] IMAGE INFORMATION COMMUNICATION APPARATUS WITH POWER INTERRUPTION REPORT GENERATION

[75] Inventor: Tatsuo Takaoka, Isehara, Japan

[73] Assignee: Ricoh Company, Ltd., Tokyo, Japan

[21] Appl. No.: 536,780

[22] Filed: Jun. 12, 1990

[30] Foreign Application Priority Data

Jun. 16, 1989 [JP] Japan ................................. 1-152190

[51] Int. Cl.⁵ .............................................. H04M 1/00
[52] U.S. Cl. ..................................... 358/404; 358/437; 358/444
[58] Field of Search ............... 358/404, 434, 437, 440, 358/444, 453, 468; 364/273.1, 273.2, 273.4, 244, 948.5, 948.6, 948.8, 965.79; 365/228

[56] References Cited

U.S. PATENT DOCUMENTS

| | | | |
|---|---|---|---|
| 4,458,307 | 7/1984 | McAnlis et al. | 364/200 |
| 4,494,149 | 1/1985 | Furukawa | 358/404 |
| 4,763,333 | 8/1988 | Byrd | 365/228 |
| 4,900,902 | 2/1990 | Sakakibara | 358/468 |
| 4,907,094 | 3/1990 | Mishima et al. | 358/437 |
| 4,975,783 | 12/1990 | Takaoka | 358/404 |

Primary Examiner—Leo H. Boudreau
Assistant Examiner—David Fox
Attorney, Agent, or Firm—Oblon, Spivak, McClelland, Maier & Neustadt

[57] ABSTRACT

An image information communication apparatus includes a communicating part which is coupled to a transmission line and exchanges image information with the transmission line, and an image memory which stores files of image information which are to be transmitted to or received from the transmission line. Further, the image information communication apparatus includes a non-volatile image memory which stores a part of the image information contained in each of the files, and a plotter which prints a document formed by the image information stored in the image memory and a report on which an image formed by the part of the image information contained in each of the files stored in the non-volatile image memory is printed when a power supply to the image information communication apparatus is stopped and then restored to an ON state.

21 Claims, 9 Drawing Sheets

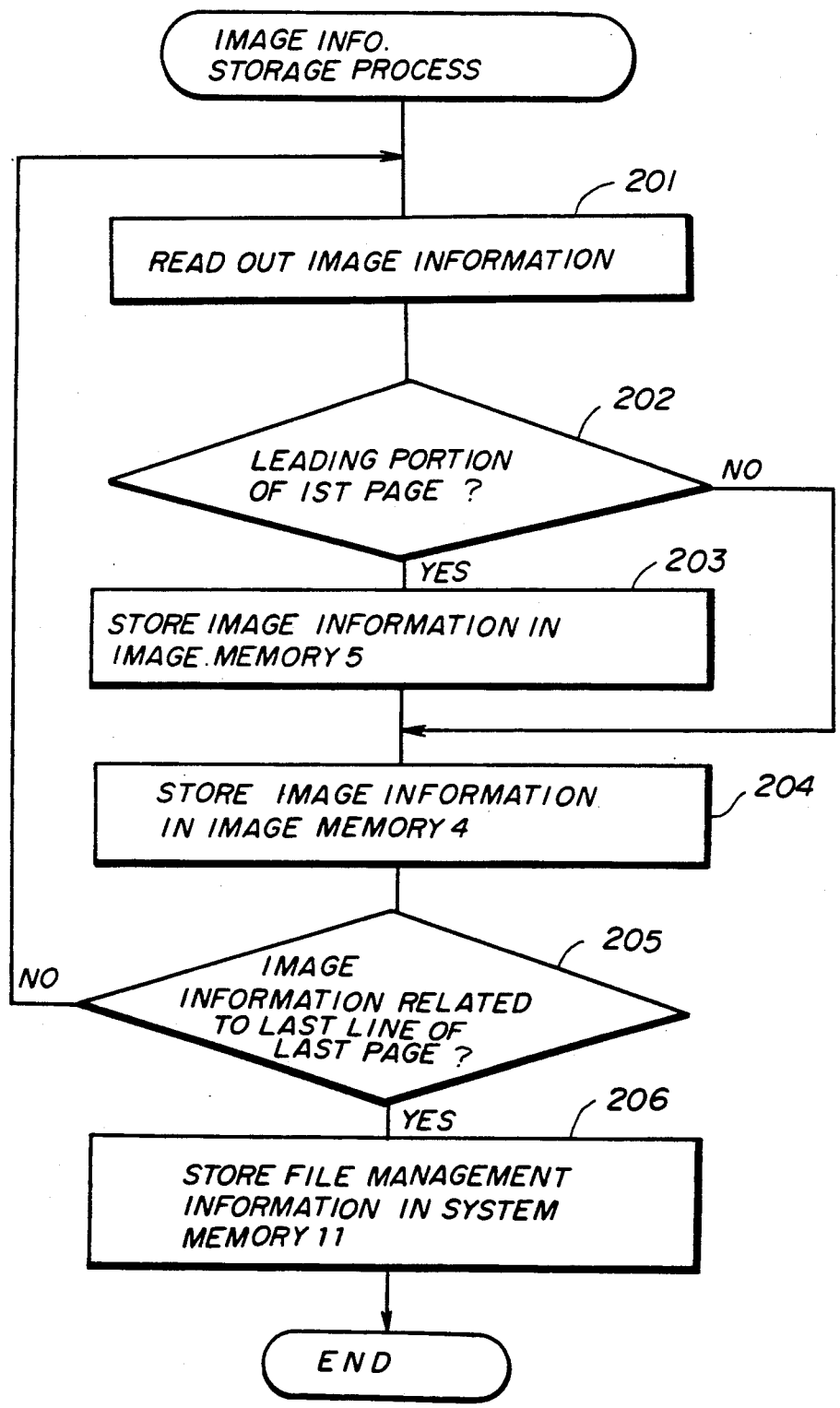

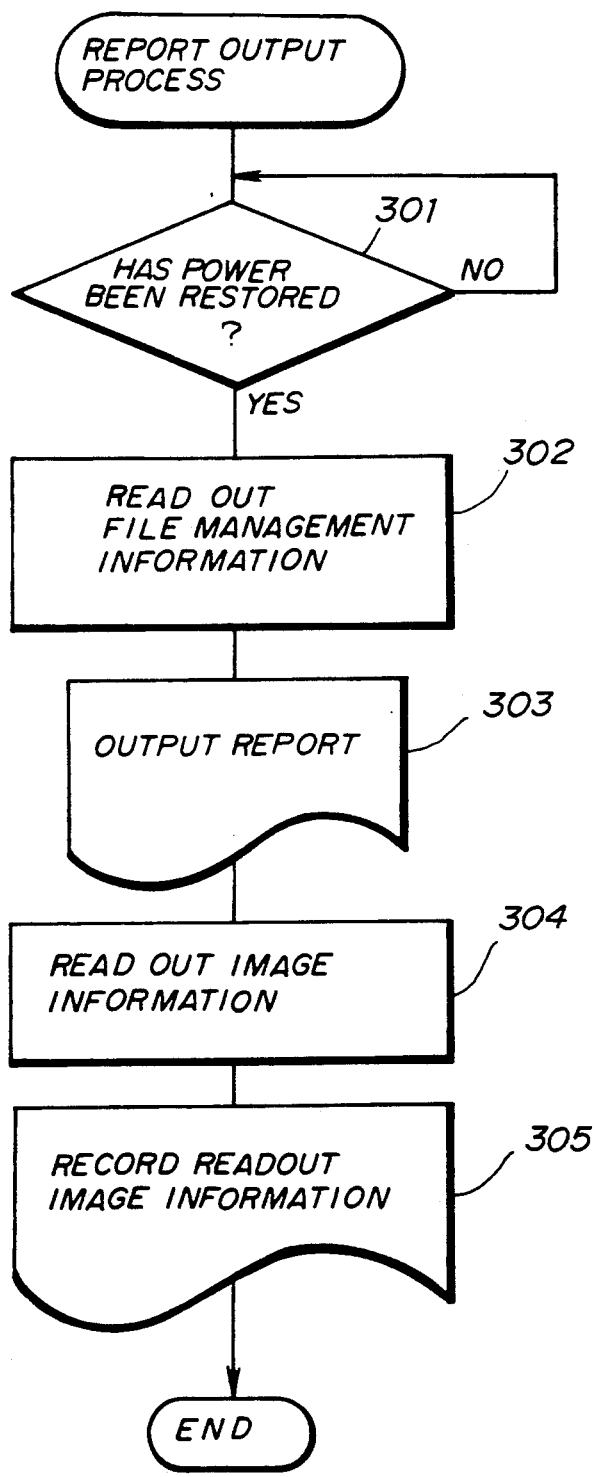

IMAGE INFORMATION COMMUNICATION APPARATUS WITH POWER INTERRUPTION REPORT GENERATION

BACKGROUND OF THE INVENTION

The present invention generally relates to an image information communication apparatus, and more particularly to a facsimile machine equipped with an image memory for storing image information.

Conventionally, facsimile machines have various functions, such as a memory transmission function, a memory receive function and a confidential receive function. In the memory transmission function, image information on a transmission document is stored in an image memory immediately and is then sent to a destination facsimile machine. In the memory receive function, an image memory is supplied with image information which is received in a state where it is impossible to record an image on a photosensitive drum. In the confidential receive function, received image information is stored in an image memory and is then output therefrom when an identification code is input. As described above, image memories built in facsimile machines are provided for realizing various functions.

Conventionally, such an image memory is formed of a volatile random access memory (RAM). Thus, when the power supply is turned OFF due to the occurrence of a power failure, image information stored in the image memory is erased. In order to overcome the above-mentioned problem, management information related to image information stored in the image memory is stored in a non-volatile memory, such as a battery-backup RAM. For example, the battery-backup RAM is supplied with the image information file number, the type of process, the destination terminal, the number of pages of a document to be transmitted, the storage time and so on. If the power supply happens to be turned OFF and is then restored to the ON state, a power-OFF report is printed out, which reports the above-mentioned management information together with the time when the power supply was turned OFF.

The operator acknowledges image information which has been erased from the power-OFF report. Then, the operator retries a transmission operation on the erased image information or requests a communication party to send the related image information again.

A conventional facsimile communication uses a special signal related to a transmission control procedure, such as a CSI signal. Such a special signal is directed to notifying the destination facsimile machine of transmitter identification information, such as the telephone number of the transmitter. Some conventional facsimile machines do not have the function of implementing such a conventional facsimile communication procedure. When a facsimile machine having the aforementioned various functions receives image information from a facsimile machine which does not have the above-mentioned facsimile communication procedure, the destination facsimile machine encounters the problems described below. If the power supply to the destination facsimile machine is turned OFF and is then restored to ON, the destination facsimile machine outputs the power-OFF report. It will be noted that this power-OFF report does not contain any information directed to identifying source facsimile machines, such as the telephone number. For this reason, the operator cannot identify source facsimile machines and cannot request source facsimile machines to send the related image information again.

If the source facsimile machine has the function of sending identification information, the operator on the destination side can identify the source facsimile machine. However, the operator cannot precisely specify image information which is requested to be retransmitted. For example, the operator cannot precisely specify a document which was transmitted from the source facsimile machine at a certain time. In a case where a plurality of documents each having an identical number of pages have been received from the same source facsimile machine, it is very difficult for the operator on the side of the source facsimile machine to determine which one of the documents should be retransmitted in response to a retransmission request from the destination facsimile machine.

On the other hand, generally, documents which are transmitted in the confidential transmission mode should be kept rigidly secret. Thus, generally, the operator on the transmission side communicates with the operator on the receive side person to person and sends image information in secrecy. From this point of view, it is not desirable that a third person know, based on the power-OFF report, the fact that confidential image information has been transmitted.

As has been described above, according to the conventional facsimile machines, it is very difficult to identify a document which has been deleted from the image memory and to keep rigidly confidential image information secret.

SUMMARY OF THE INVENTION

It is a general object of the present invention to provide an improved image information communication apparatus in which the aforementioned disadvantages are eliminated.

A more specific object of the present invention is to provide an image information communication apparatus in which the operator can easily identify a document (image information) which he or she requests to be retransmitted and sends confidential image information secretly.

The above-mentioned objects of the present invention are achieved by an image information communication apparatus comprising:

communicating means, coupled to a transmission line, for exchanging image information with the transmission line;

first memory means for storing files of image information which are to be transmitted to or received from the transmission line;

second non-volatile memory means for storing a part of the image information contained in each of the files;

printing means, coupled to the second non-volatile memory, for printing a document formed by the image information stored in the first memory means and a report on which an image formed by the part of the image information related to each of the files stored in the second non-volatile memory means is printed when a power supply to the image information communication apparatus is stopped and then restored to an ON state.

The aforementioned objects of the present invention are also achieved by an image information communication apparatus comprising:

communicating means, coupled to a transmission line, for exchanging image information with the transmission line;

first memory means for storing a first group of files of image information which are to be transmitted to or received from the transmission line;

second non-volatile memory means for storing a second group of files of image information which are to be transmitted to or received from the transmission line;

printing means, coupled to the second non-volatile memory, for printing a document formed by the image information stored in the first memory means, a document formed by the image information stored in the second non-volatile memory means, and a report on which file management information related to the first group of files stored in the first memory means is printed when a power supply to the image information communication apparatus is stopped and then restored to an ON state.

BRIEF DESCRIPTION OF THE DRAWINGS

Other objects, features and advantages of the present invention will become apparent from the following detailed description when read in conjunction with the accompanying drawings, in which:

FIG. 3 is a flowchart illustrating an image information storing procedure;

FIG. 6 is a flowchart of a procedure for printing a power-OFF report according to the first embodiment of the present invention;

DESCRIPTION OF THE PREFERRED EMBODIMENTS

Figure 1:
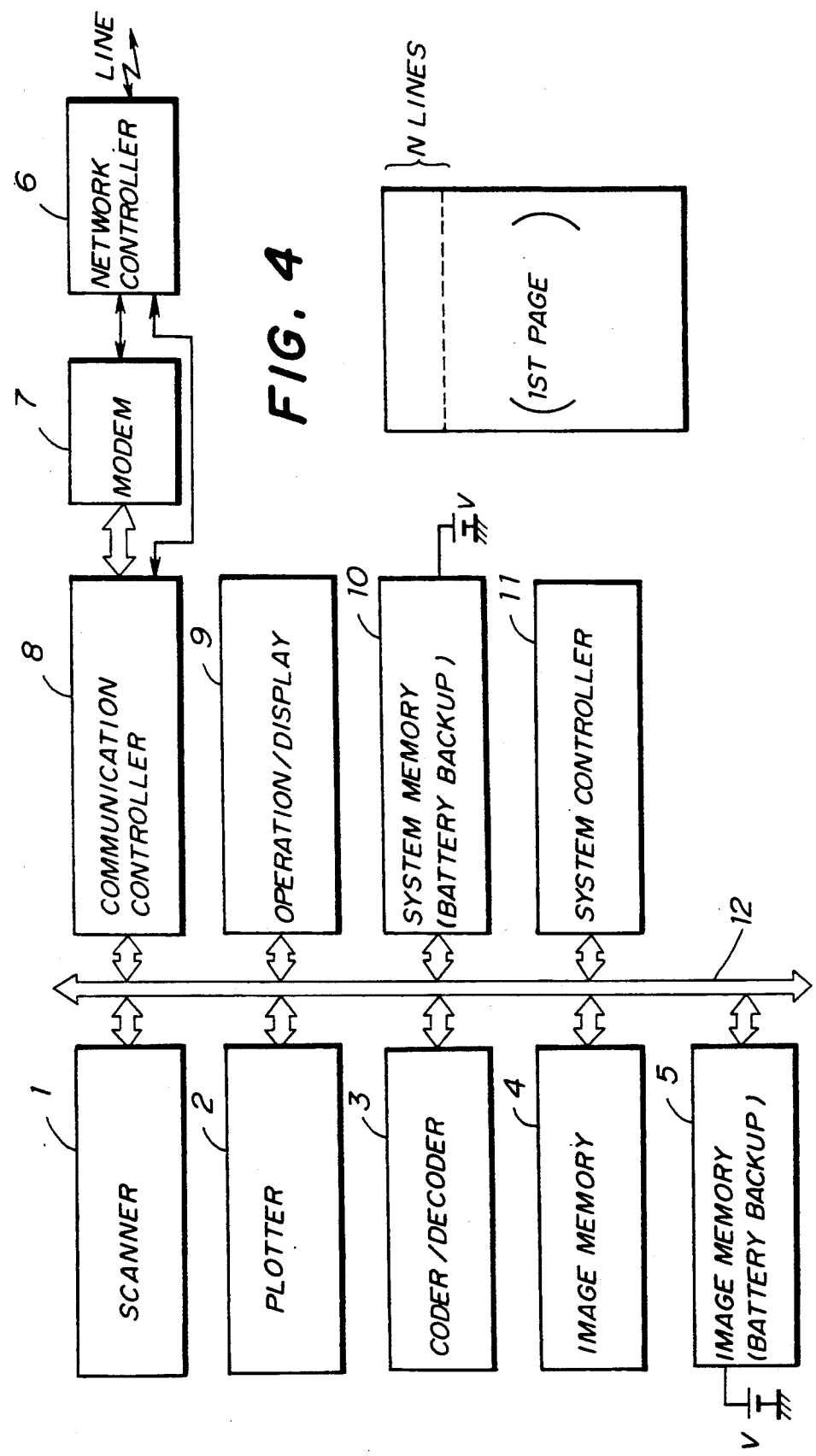
FIG. 1 is a block diagram of a facsimile machine according to a preferred embodiment of the present invention.

A description will now be given of a facsimile machine according to a preferred embodiment of the present invention. Referring to FIG. 1, a facsimile machine includes a scanner 1, a plotter 2, a coder/decoder 3, an image memory 4, a battery-backup image memory 5, a network controller 6, a modem (modulator/demodulator) 7, a communication controller 8, an operation/display device 9, a battery-backup system memory 10 and a system controller 11. The above-mentioned elements except the modem 7 and the network controller 6 are connected to a bus 12.

The scanner 1 optically reads a document and outputs an electrical image signal. The plotter 2 records image information on a recording medium such as paper. The coder/decoder 3 encodes image information to be transmitted and decodes encoded image information received from a source facsimile machine. Each of the image memories 4 and 5 functions to store image information which is to be transmitted or has been received. The image memory 4 is formed of a volatile RAM, and the battery-backup image memory 5 is formed of a battery-backup non-volatile RAM. Reference V indicates a battery. The network control device 6 performs a conventional line control coupled to a network (not shown), which includes a procedure for capturing a line to be used, a procedure for sending a select signal including the identification number (telephone number) of the source facsimile machine and a procedure for detecting a terminating call. The modem 7 modulates image information to be transmitted and demodulates received image information. Further, the modem 7 executes procedure signals in a conventional G3 and/or G4 transmission control procedure, such as those defined by the CCITT recommendations. The communication controller 8 controls the network controller 6 and the modem 7 and executes facsimile transmission in accordance with the transmission control procedure. The operation/display device 9 has a display device such as a liquid display device, and a key board such as a ten key. The display device displays the status of the facsimile machine being considered, various operation guide lines and so on. The operator operates the key board and inputs various instructions. The system memory 10 manages image information stored in the image memories 4 and 5, and stores a variety of information necessary for the operation of the facsimile machine being considered. The system controller 11 includes a microcomputer system, and controls the structural elements shown in FIG. 1, as will be described in detail later.

The facsimile machine shown in FIG. 1 has, as functions (modes) related to a receiving procedure, a normal receive function of receiving image information and immediately recording the same on paper by the plotter 2, a memory receive function and a confidential receive function. In the memory receive function (mode), image information which is received during the time when the facsimile machine is busy recording image information on paper, is stored in the image memory 4. In the confidential receive function, received image information is stored in the image memory 4, and is recorded on paper when an identification code identical to a predetermined identification code is input. The facsimile machine shown in FIG. 1 also has, as functions (modes) related to a transmission procedure, a normal transmission function of reading a document and immediately sending image information about this document to a destination, and a memory transmission function of storing image information in the image memory 4 and sending the same to a destination at a specified time. The above-mentioned functions related to the receive procedure are activated when the facsimile machine being considered receives a terminating call addressed thereto. On the other hand, functions related to the transmission procedure are activated by corresponding key operations by the operator. As will be described in detail later, the battery-backup image memory is used for storing some of the image information.

Figure 2:
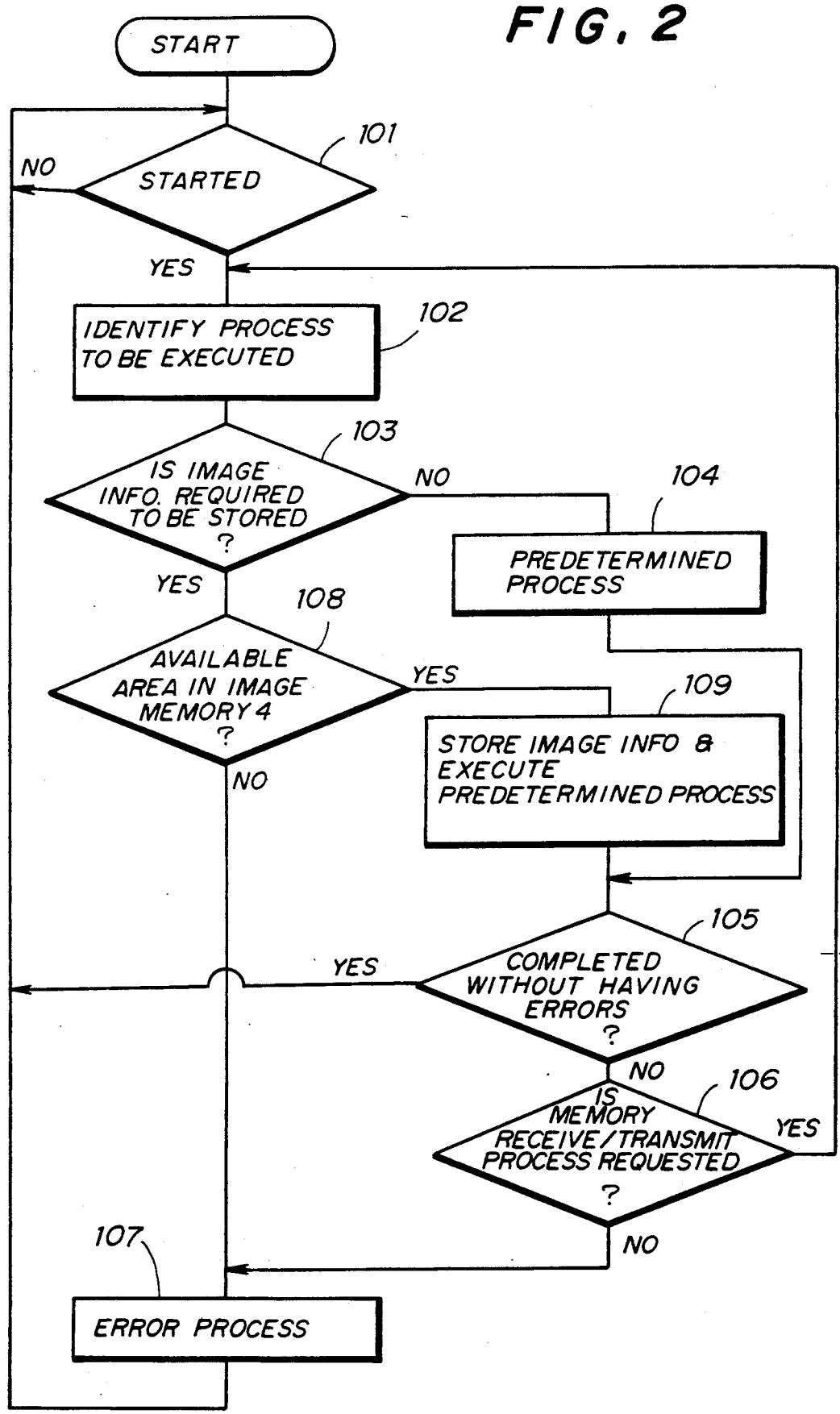
FIG. 2 is a flowchart illustrating a procedure for executing various modes according to the first embodiment of the present invention.

Referring to FIG. 2, the system controller 11 of the facsimile machine being considered always determines whether or not a call is terminated or whether or not an activating operation is carried out by the operator (step 101). In other words, the system controller 11 determines whether to start the procedure shown in FIG. 2 or not. When the result obtained at step 101 is YES, the system controller 11 determines what process should be executed (requested) (step 102). Subsequently, the system controller 11 determines whether or not the process determined at step 102 requires that image information be stored (step 103). In the aforementioned normal transmission or receive mode, it is not necessary to store image information. If the facsimile machine is in the normal transmission mode or the normal receive mode which do not need the procedure for storing image information, a predetermined transmission procedure or receive procedure is carried out (step 104). When the procedure at step 104 is completed, the system controller 11 determines whether or not the procedure at step 104 has been completed without having encountered errors (step 105). When image information has been sent or received without any errors, the control procedure returns to step 101.

The facsimile machine shown in FIG. 1 has the memory receive function, which is executed when it becomes impossible to record image information on paper, due to the occurrence of, for example, a paper jam during the image receiving procedure. In the memory receive function, received image information is stored in the image memory 4. When a paper jam takes place during the execution of step 104, the result obtained at step 105 becomes NO. In this case, the system controller 11 determines whether or not the memory receive procedure should be continuously performed (step 106). When it is instructed to execute the memory receive procedure, the control procedure returns to step 102. On the other hand, when it is not instructed to execute the memory receive procedure, the system controller 11 informs the source facsimile machine of the occurrence of an error and terminates the communication procedure (step 107). Then the control procedure returns to step 101. Normally, the control procedure shown in FIG. 2 is set so that it automatically returns to step 102. Alternatively, an instruction indicating whether or not the memory receive procedure (mode or function) should be executed is manually input to the facsimile machine through the operation/display device 9.

When step 102 is executed by the memory receive function, the system controller 11 determines what procedure should be executed. Subsequently, the system controller 11 determines, at step 103, whether or not the requested procedure requires that image information to be stored. When the memory receive function is requested, the result at step 103 is YES. After that, the system controller 11 determines whether or not there is an available storage area in the image memory 4 (step 108). When the result obtained at step 108 is YES, image information is continuously received (step 109). The received information is stored in the image memory 4 (and/or the battery-backup image memory 5), as will be described below.

Figure 4:
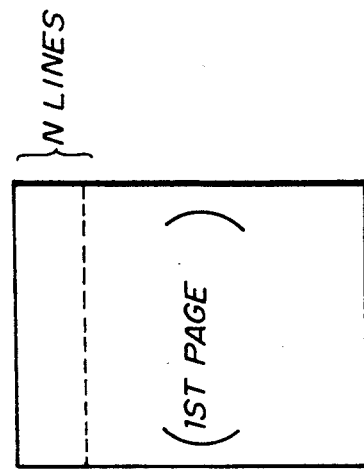
FIG. 4 is a diagram showing a leading portion of a document.

FIG. 3 is a flowchart of a procedure for storing image information in the memory receive mode. Image information amounting to one line is sequentially drawn from the receive information under the control of the system controller 11 (step 201). Normally, image information is successively written into the image memory 4. Then, the system controller 11 determines whether or not image information amounting to one line being processed is related to a leading portion of the first page of a document received from the source facsimile machine. As shown in FIG. 4, the leading portion of the first page corresponds to first N lines from the leading end of the first page. This means that the procedure at step 202 determines whether or not image information amounting to one line being processed is one of the N lines. When the result obtained at step 202 is YES, the image information is written into only the battery-backup image memory 5 (step 203) and then the image memory 4 (step 204). On the other hand, when it is determined, at step 202, that the image information being processed is related to a line other than the N lines, the image information is written into only the image memory 4. The system controller 11 has a software program counter which counts the number of lines which have been processed. After that, the system controller 11 determines whether or not image information being processed is related to the last line of the last page (step 205). When the result at step 205 is YES, the procedure returns to step 201. On the other hand, when the result at step 205 is NO, that is, when image information related to all the lines of the document has been received, the control procedure proceeds to step 206. At step 206, file management information related to the stored image information is written into the battery-backup system memory 10 under the control of the system controller 11. Image information related to one document is managed by assigning the same a file number. The management information includes, for every file, the file number, the type of process (memory receive mode in this case), the identification (address) number of a communication party (the telephone number of the source facsimile machine in this case), the number of pages of the document and the storage time. In this manner, the procedure shown in FIG. 3 is executed at step 109. When the procedure at step 109 has been completed without having encountered errors, the control procedure returns to step 101. On the other hand, if the procedure at step 109 is ended there has been errors in the memory receive mode, the procedure at step 106 is executed in which the procedure at step 109 is stopped.

A description will now be given of a procedure which is executed when the memory transmission procedure (mode) is activated by the operator, and a procedure which is executed when image information is received in the confidential receive procedure (mode). After the procedure is started at step 101, it is determined, at step 102, what procedure should be performed. When either the memory transmission procedure or the confidential transmission procedure is requested, the result at step 103 is affirmative. The system controller 11 determines whether or not there is an available area in the image memory 4 (step 108). When the result at step 108 is YES, the requested procedure is executed at step 109.

In the case where the confidential receive procedure is executed, image information amounting to one line is drawn from the received image information as in the case of the aforementioned memory receive procedure. In the case where the memory transmission procedure is executed, image information amounting to one line is drawn from image information obtained by optically reading a document by means of the scanner 1. Then the aforementioned procedure shown in FIG. 3 is executed.

After it is determined that the requested procedure is ended, the system controller 11 determines whether or not the procedure has been completed without encountering errors (at step 105 shown in FIG. 2). When the result at step 105 is YES, the control procedure returns to step 101. On the other hand, when the result at step 105 is NO, the predetermined error procedure at step 106 is executed.

Figure 5A:
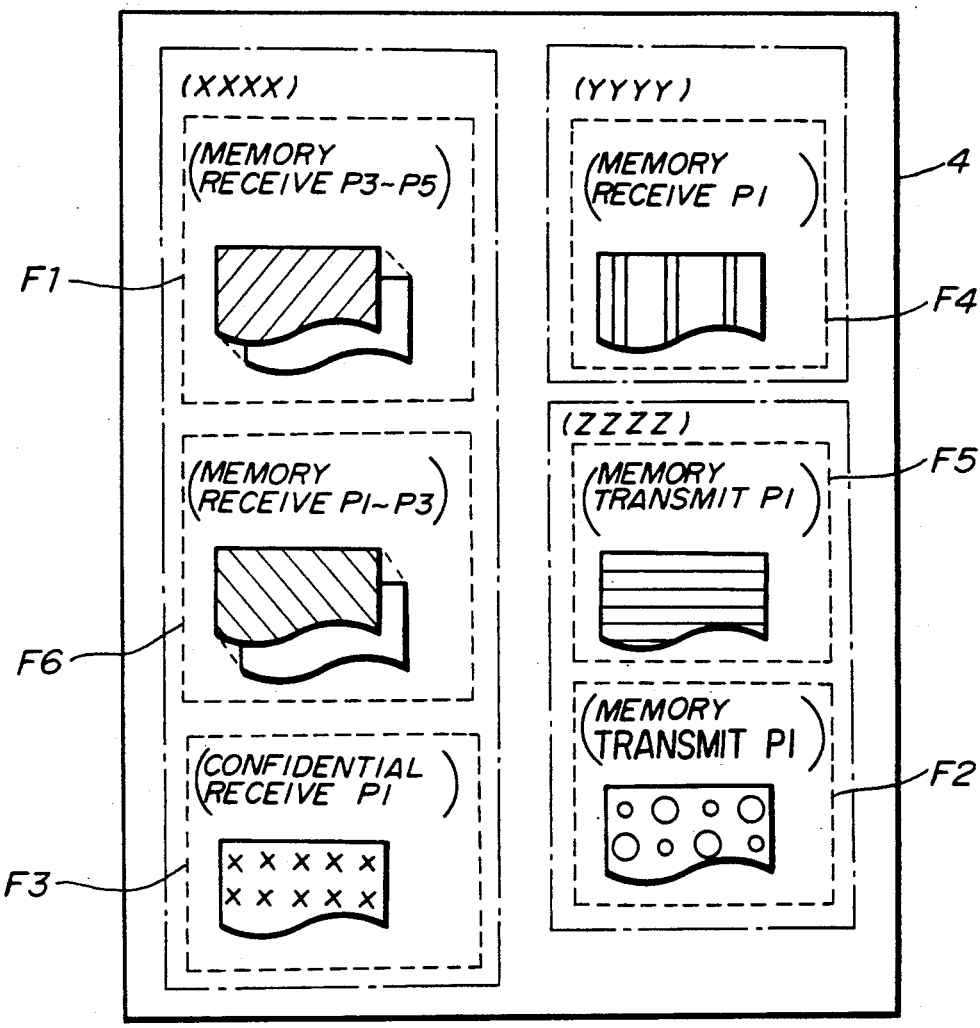
FIG. 5A is a diagram illustrating image information stored in a volatile image memory provided in the facsimile machine shown in FIG. 1.

FIG. 5A illustrates image information stored in the image memory 4 in accordance with the procedures shown in FIGS. 2 and 3. The image memory 4 stores files F1 and F6 which have been received from source facsimile machine XXXX in the memory receive mode, and file F3 which has been received therefrom in the confidential receive mode. In the case of the file F1, after two pages P1 and P2 have been received, the plotter 2 (FIG. 1) is changed to a state in which it is impossible to record image information on paper due to the occurrence of, for example, a paper jam, and then three pages P3, P4 and P5 are received in the memory receive mode. The file F6 includes three pages P1, P2 and P3. The image memory 4 also stores file F4 which has been received from source facsimile machine YYYY in the memory receive mode, and files F2 and F5 which are to be sent to destination facsimile machine ZZZZ. Each of the files F2, F3, F4 and F5 has image information amounting to one page.

Figure 5B:
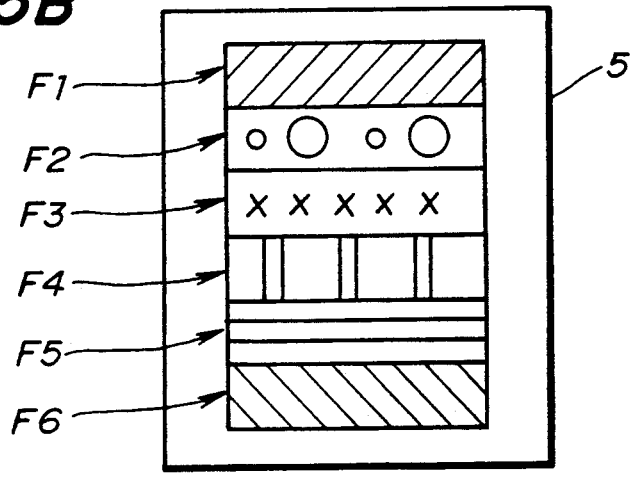
FIG. 5B is a diagram illustrating image information stored in a non-volatile image memory provided in the facsimile machine shown in FIG. 1.

In the case where the image memory 4 stores image information shown in FIG. 5A, the battery-backup image memory 5 has information shown in FIG. 5B. As shown in FIG. 5B, the battery-backup image memory 5 stores image information related to the leading portion (N lines) of the first page of each of the files F1 through F6.

It will now be assumed that power supplied to the facsimile machine shown in FIG. 1 has been turned OFF due to the occurrence of a power failure in the state where the image memory 4 has image information shown in FIG. 5A and the battery-backup image memory 5 has image information shown in FIG. 5B. In this case, all the information stored in the image memory 4 is erased. It will be noted that the contents of the battery-backup image memory 5 and the battery-backup system memory 10 are maintained without being deleted even if the power supply is abruptly stopped.

In this case, the system controller 11 monitors the restoration of the power supply at step 301 shown in FIG. 6. When the system controller 11 determines that the power supply has been restored at step 301, the system controller 11 reads out the file management information from the system memory 10 (step 302). Then the system controller 11 controls the plotter 2 so that it outputs a printed power-OFF report (step 303).

Figure 7:
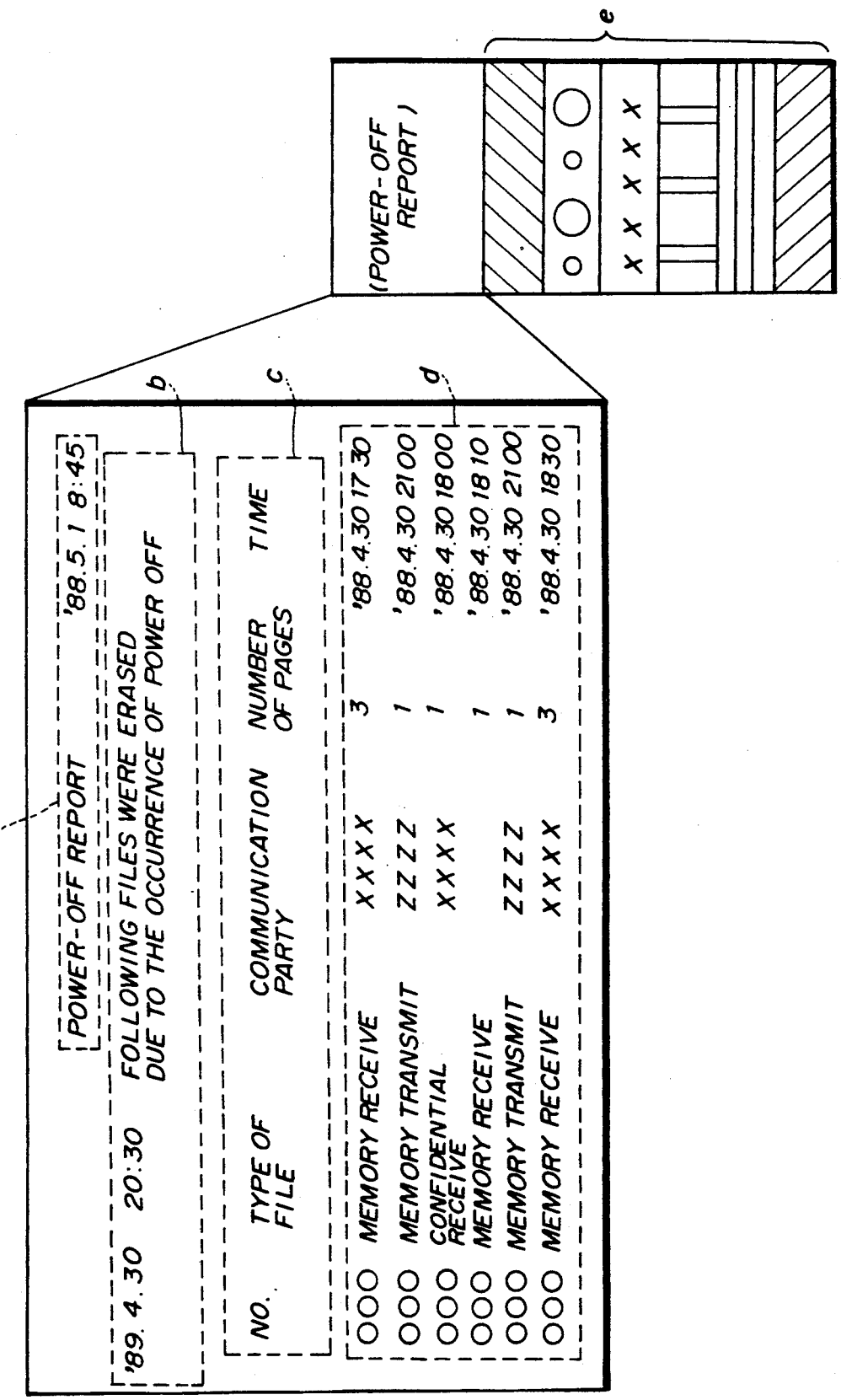
FIG. 7 is a diagram of the power-OFF report obtained by the procedure shown in FIG. 6.

FIG. 7 illustrates the power-OFF report. At first, the plotter 2 prints the title of the report, "POWER-OFF REPORT" (indicated by reference a), the recording date and time (b), and a message representing the time when the power supply is turned OFF (c). Below the message (c), file management information related to the files F1 through F6 is printed. As has been described previously, the file management information includes the file number, the type of file, the destination, and the number of pages and receive date and time or transmission date and time. It will be noted that FIG. 7 is related to a case where the source facsimile machine YYYY does not have the function of sending its own identification information. Thus, no information on the source facsimile machine related to the file F4 is recorded.

Turning to FIG. 6, the system controller 11 reads out image information from the battery-backup image memory 5 (step 304). Then, under the control of the system controller 11, the plotter 2 prints images of the leading portions (corresponding to N lines) of the first pages of the files F1 through F6 (step 305), as shown by reference e in FIG. 7. The image of the leading portion of the first page of the file F1 is printed just below the file management information related to the file F6. In this manner, the images of the leading portions of the first pages of the files F1 through F6 are printed on the power-OFF report.

The operator refers to the power-OFF report and can perform the operation of retransmitting image information to the destination facsimile machine and/or input a request to retransmit necessary image information. It will be noted that the operator recognizes each of the files F1 through F6 from the printed images of the leading portions of the first pages of the files F1 through F6 on the power-OFF report. For example, the operator can identify the files F1 through F6 as follows. It will be now assumed that the files F1 and F6 have been received from the source facsimile machine XXXX in the memory receive mode and have three pages. However, the printed leading portion of the file F1 is different from that of the file F6. Thus, the operator can discriminate the files F1 and F6 from each other. Similarly, it is possible for the operator to discriminate the files F2 and F5 from each other from the printed images of the leading portions of the first pages thereof.

Figure 8A:
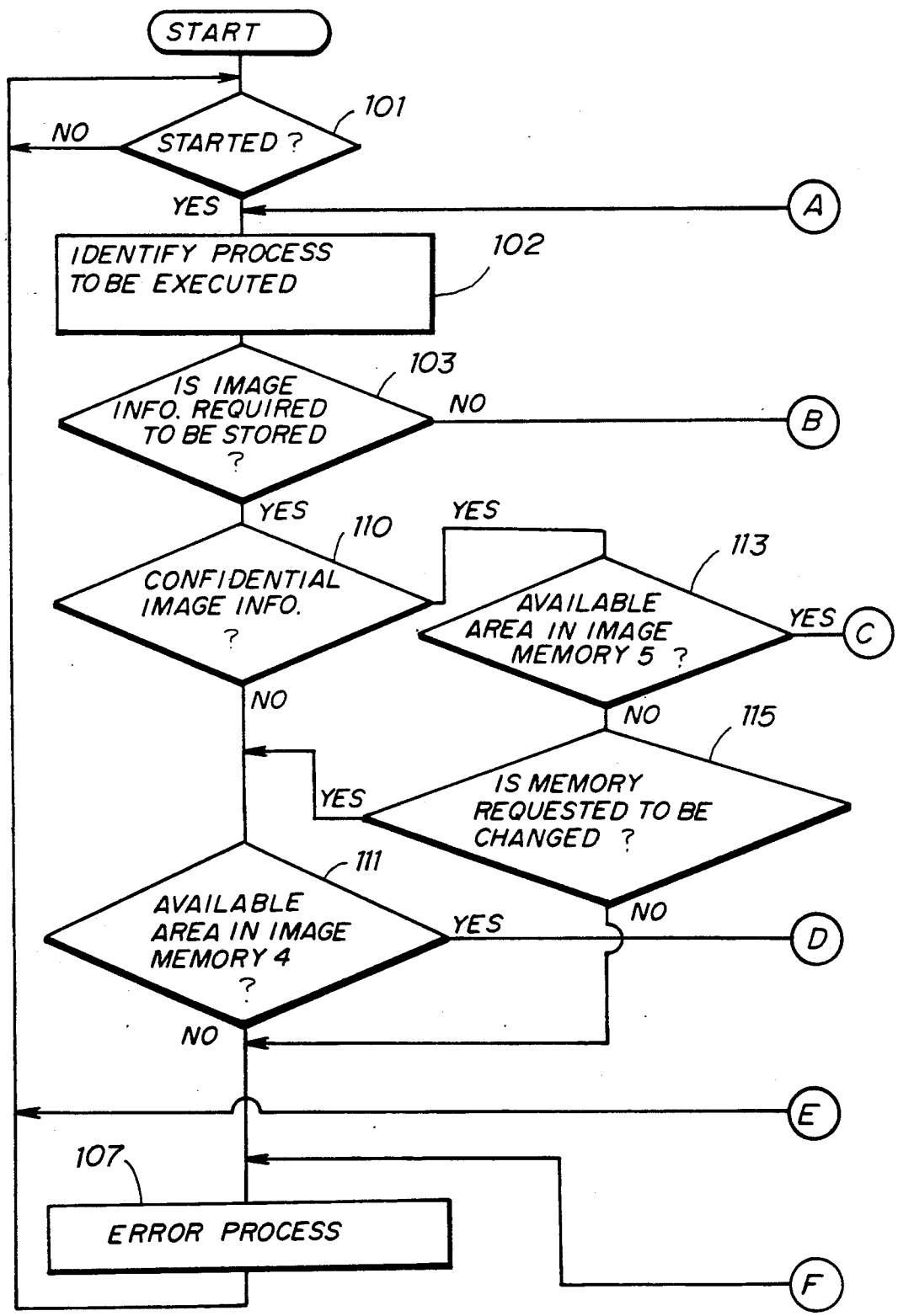
FIGS. 8A and 8B are a flowchart illustrating a procedure for executing various modes according to a second preferred embodiment of the present invention.
Figure 8B:
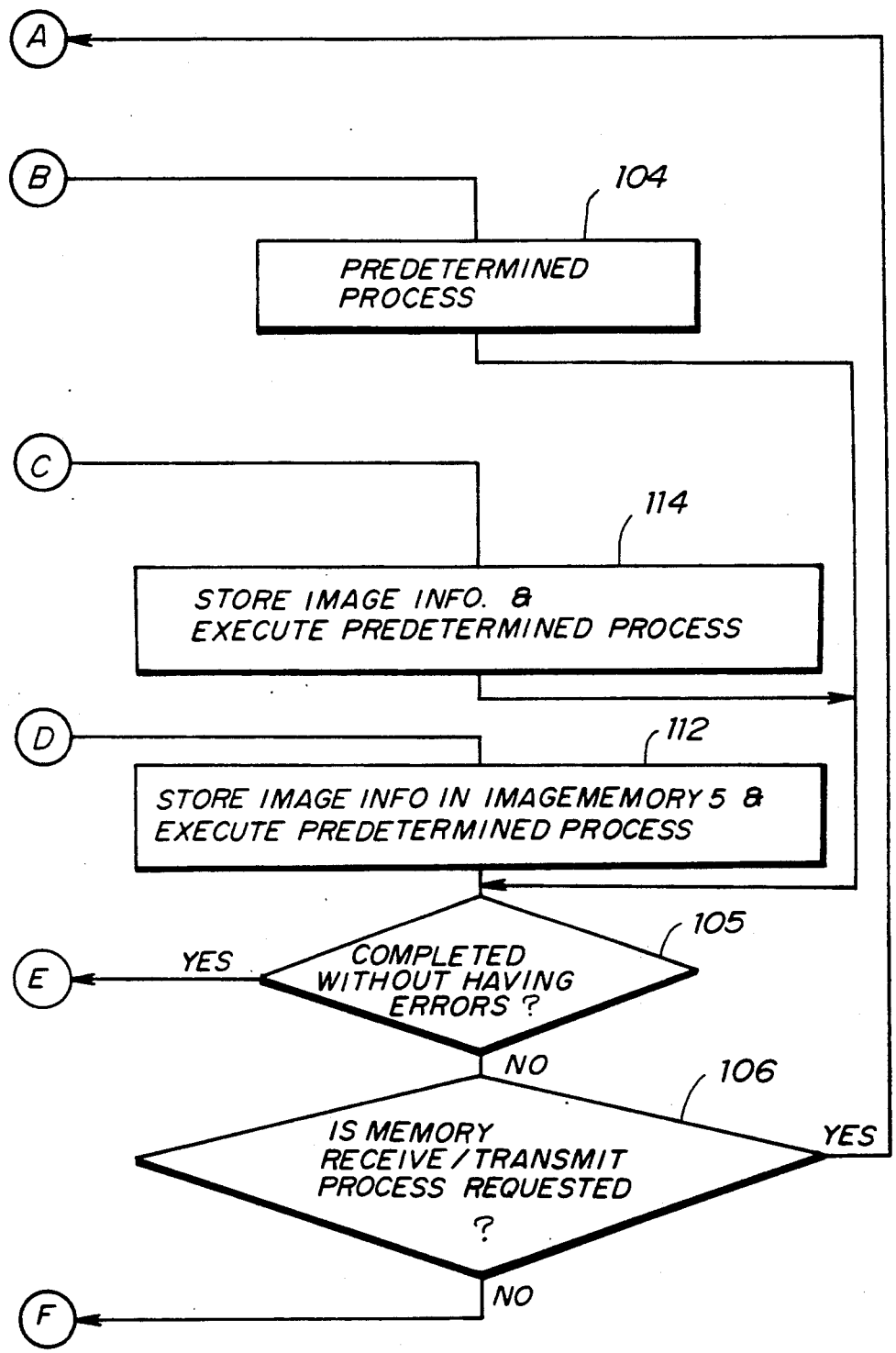

A description will now be given of a second preferred embodiment of the present invention with reference to FIGS. 8 and 9. In FIG. 8, those parts which are the same as those shown in the previous figures are given the same reference numerals. The facsimile machine according to the second embodiment of the present invention has a memory storage confidential transmission mode (function), a repeater transmission mode (function), a polling transmission wait mode (function), and a broadcasting transmission mode (function) in addition to the modes (functions) which are carried out in the aforementioned facsimile machine according to the first embodiment of the present invention. In the memory storage confidential transmission mode, image information related to a transmission document is stored in the image memory 4 and is then sent as confidential information. In the repeater transmission mode, the source facsimile machine sends a facsimile machine which is to be requested to serve as a repeater an instruction which instructs the facsimile machine to serve as a repeater and image information. In the polling transmission wait mode, image information is stored in the image memory 4 and is sent when the source facsimile machine is called by the destination facsimile machine and is requested to send the image information. In the broadcasting mode, a plurality of designated destination facsimile machines are sequentially called and image information is sent thereto.

In the second embodiment of the present invention, the operator inputs an instruction to stop the procedure being considered or to continue to execute the procedure by means of the operation/display device 9 in order to cope with a case where there is no available area in the battery-backup image memory 5. In the second embodiment, the process which does not require that image information be stored is carried out in the same way as in the aforementioned first embodiment of the present invention. On the other hand, when a process requires that image information be stored, the system controller 11 determines, at step 110 (FIG. 8), whether the process to be executed is related to the confidential receive mode or the confidential transmission mode. When it is determined, at step 110, that the process is not related to any of the confidential modes, the system controller 11 determines whether there is an available storage area in the image memory 4 (step 111). When the result obtained at step 111 is YES, image information is stored in the image memory 4 and the corresponding procedure is executed (step 112). On the other hand, when it is determined, at step 111, that there is no available area in the image memory 4, the error process is performed at step 107.

On the other hand, in the case where the process to be executed is either the confidential receive mode or the confidential transmission mode, the system controller 11 determines whether or not there is an available area in the image memory 5 (step 113). If the result at step 113 is YES, image information is stored in the image memory and the corresponding procedure is executed (step 114). On the other hand, if there is no available area in the image memory 5, the system controller 11 refers to the instruction input by the operator (step 115). If the instruction by the operator reports that the process should be stopped when there is no available area in the battery-backup image memory 5, the error process is executed (step 107). On the other hand, if the instruction reports that the process should be continuously executed, the process is executed using the image memory 4 (step 111).

Figure 9:
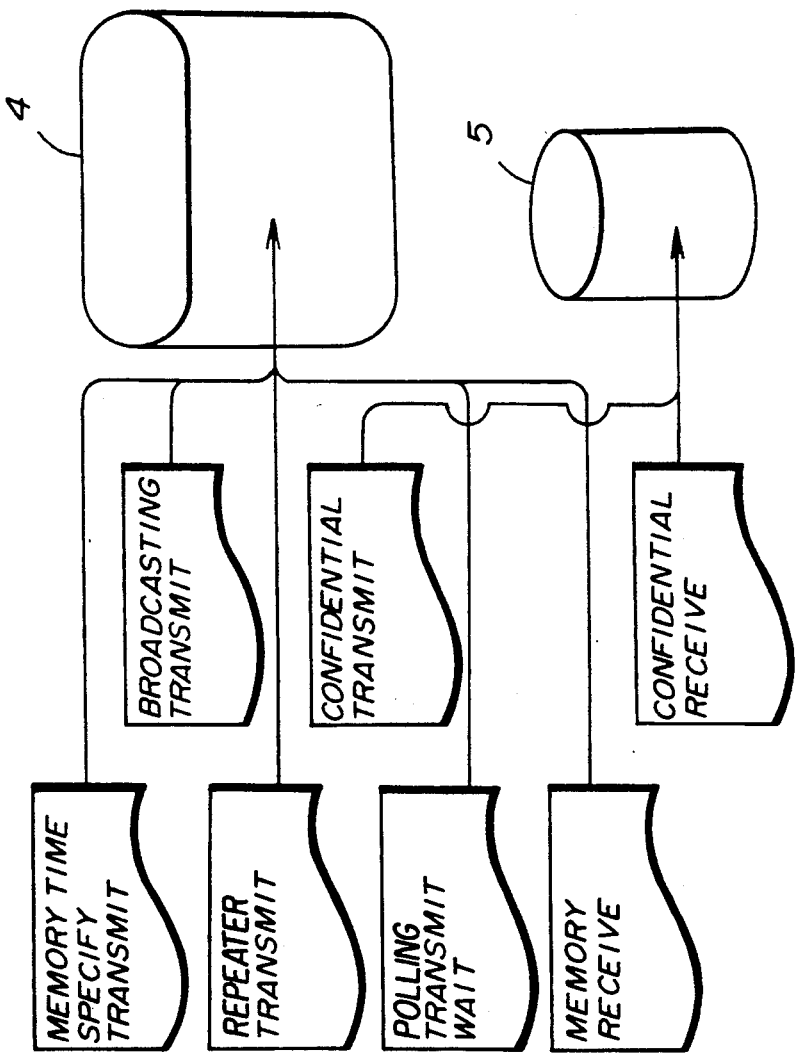
FIG. 9 is a diagram illustrating how to selectively store image information in the volatile image memory and the non-volatile image information.

In the above-mentioned procedure, as shown in FIG. 9, image information related to only the confidential receive mode and the confidential transmission mode and image information related to the leading portion of image information stored in the volatile memory are stored in the battery-backup image memory 5, and image information related to modes other than the confidential modes is stored in the image memory 4.

It is now assumed that in this state, the power supply is turned OFF due to the occurrence of a power failure. The image information in the image memory 4 is deleted, while the image information in the battery-backup image memory 5 is maintained without being destroyed. Then a power-OFF report which has the same format as that shown in FIG. 7 and which indicates information related to only the deleted image information is printed out obtained from the leading portion of image information stored in the non-volatile memory. Thus, it is possible to prevent a third person from knowing that confidential information has been communicated even if the third person sees the power-OFF report.

In the above-mentioned second embodiment of the present invention, the facsimile machine is designed to store only confidential image information in the battery-backup image memory 5. Of course, it is possible to keep image information other than confidential image information secret by inputting a predetermined command through the operation/display device 9. Alternatively, the image memory 4 is formed of a non-volatile image memory (battery-backup image memory).

The present invention is not limited to the specifically described embodiments, and variations and modifications may be made without departing from the scope of the present invention.

What is claimed is:

1. An image information communication apparatus comprising:

communicating means, coupled to a transmission line, for exchanging image information with said transmission line;

first memory means for storing files of image information which are to be transmitted to or received from said transmission line;

second non-volatile memory means for storing a part of the image information contained in each of said files;

printing means, coupled to said second non-volatile memory, for printing a document listing the files of the image information stored in said first memory means and showing an image formed by said part of the image information contained in each of the files stored in said second non-volatile memory means when a power supply to said image information communication apparatus is turned off and then restored to an ON state.

2. An image information communication apparatus as claimed in claim 1, wherein:

each of said files includes at least one page of the document; and said second non-volatile memory means stores said part of the image information which is related to a predetermined leading portion of a first page of each of said files.

3. An image information communication apparatus as claimed in claim 2, wherein said leading portion of the first page of each of said files amounts to a predetermined number of lines on the document.

4. An image information communication apparatus as claimed in claim 1, further comprising:

management means for managing file management information related to each of said files, said file management information including, for each of said files, at least a file number, a destination apparatus and a number of pages; and third non-volatile memory means, coupled to said management means, for storing said file management information, wherein said printing means is coupled to said third non-volatile memory means and prints said report which includes said file management information in addition to said image formed by said part of the image information related to each of the files stored in said second non-volatile memory means.

5. An image information communication apparatus as claimed in claim 4, wherein:

said first memory means includes a volatile memory which stores said image information;

said image information in said volatile memory is erased when the power supply to said image information communication apparatus is turned off; and said file management information is related to said image information in said volatile memory.

6. An image information communication apparatus as claimed in claim 1, further comprising input means, coupled to said communicating means, for inputting an instruction which indicates image information to be retransmitted from said image information communication apparatus to a communication party coupled to said transmission line.

7. An image information communication apparatus as claimed in claim 1, further comprising input means, coupled to said communicating means, for inputting an instruction which indicates image information to be retransmitted to a communication party coupled to said transmission line.

8. An image information communication apparatus as claimed in claim 1, further comprising control means for supplying image information received from a communication party coupled to said transmission line directly to said printing means in a first mode and for supplying said first memory means and said second non-volatile memory means with said image information received from the communication party in a second mode.

9. An image information communication apparatus as claimed in claim 8, wherein said control means comprises means for determining whether or not said printing means is printing said document and for setting said image information communication apparatus to said second mode when it is determined that said printing means is printing said document.

10. An image information communication apparatus as claimed in claim 1, further comprising:
  read means for reading an original and generating image information about said original;
  control means for supplying said image information supplied from said read means directly to said communicating means in a first mode and for supplying said image information from said read means to said first memory means and said second non-volatile memory means in a second mode, said image information from said read means being stored, as one file, in said first memory means.

11. An image information communication apparatus as claimed in claim 10, further comprising input means for inputting an instruction which indicates whether said image information communication apparatus should be set to said first mode or said second mode and for inputting a specified time at which said image information stored in said first memory should be transmitted,
  wherein said control means includes means for supplying said image information stored in said first memory means to said communication means when said specified time is obtained.

12. An image information communication apparatus as claimed in claim 1, further comprising:
  determining means for determining whether or not an identification code which is supplied from a communication party coupled to said transmission line and which is related to at least one of said files is identical to a predetermined identification code; and
  control means, coupled to said determining means and said communicating means, for reading out image information related to said at least one of the files when said determining means determines that said identification code is identical to said predetermined identification code.

13. An image information communication apparatus as claimed in claim 1, wherein said second non-volatile memory means includes a battery-backup random access memory.

14. An image information communication apparatus as claimed in claim 10, wherein said image information communication apparatus is a facsimile machine.

15. An image information communication apparatus comprising:
  communicating means, coupled to a transmission line, for exchanging image information with said transmission line;
  first memory means for storing a first group of files of image information which are to be transmitted to or received from said transmission line;
  second non-volatile memory means for storing a second group of files of image information which are to be transmitted to or received from said transmission line;
  printing means, coupled to said second non-volatile memory, for printing a document listing the files of the image information stored in said first memory means, showing the image information stored in said second non-volatile memory means, and showing file management information related to said first group of files stored in said first memory means when a power supply to said image information communication apparatus is turned off and then restored to an ON state.

16. An image information communication apparatus as claimed in claim 15, wherein said first memory means comprises a volatile memory which stores said first group of files of image information.

17. An image information communication apparatus as claimed in claim 15, further comprising:
  management means for managing said file management information related to said first group of files, said file management information including, for each of said first group of files, at least a file number, a destination apparatus and a number of pages; and
  third non-volatile memory means, coupled to said management means, for storing said file management information,
  wherein said printing means is coupled to said third non-volatile memory means and prints said document which includes said file management information related to said first group of files.

18. An image information communication apparatus as claimed in claim 15, wherein said second group of files of image information is related to confidential image information which is addressed to only a special person on the side of a communication party coupled to said transmission line or the side of said image information communication apparatus.

19. An image information communication apparatus as claimed in claim 18, further comprising input means for inputting an instruction which requests that image information to be transmitted be handled as said confidential information.

20. An image information communication apparatus as claimed in claim 15, wherein said second group of files of image information is related to image information which is addressed to a plurality of communication parties coupled to said transmission line.

21. An image information transmission apparatus as claimed in claim 15, wherein said image information transmission apparatus comprises read means for reading an original and generating image information about said original, and wherein said image information transmission apparatus is a facsimile machine.

* * * * *